(12) United States Patent
Smith et al.

(10) Patent No.: US 8,652,371 B2
(45) Date of Patent: Feb. 18, 2014

(54) CONSTANT PRESSURE INFUSION PROCESS FOR RESIN TRANSFER MOLDING

(75) Inventors: Mitchell David Smith, Bel Air, MD (US); Marc Doyle, Paris (FR)

(73) Assignee: Cytec Technology Corp., Wilmington, DE (US)

( * ) Notice: Subject to any disclaimer, the term of this patent is extended or adjusted under 35 U.S.C. 154(b) by 482 days.

(21) Appl. No.: 12/616,293

(22) Filed: Nov. 11, 2009

(65) Prior Publication Data

US 2010/0124654 A1 May 20, 2010

Related U.S. Application Data (60) Provisional application No. 61/116,611, filed on Nov. 20, 2008.

(51) Int. Cl.
*B29C 70/36* (2006.01)

(52) U.S. Cl.
USPC ............................. 264/101; 264/241; 264/257

(58) Field of Classification Search
USPC .......................................... 264/101, 241, 257
See application file for complete search history.

(56) References Cited

U.S. PATENT DOCUMENTS

| | | | |
|---|---|---|---|
| 2,495,640 A | 1/1950 | Muskat | |
| 2,913,036 A | 11/1959 | Smith | |
| 4,311,661 A * | 1/1982 | Palmer | 264/510 |
| 4,902,215 A | 2/1990 | Seemann, III | |
| 4,942,013 A | 7/1990 | Palmer et al. | |
| 6,482,497 B1 * | 11/2002 | Kay et al. | 428/111 |
| 2001/0048995 A1 * | 12/2001 | Eschenfelder et al. | 428/69 |
| 2002/0167119 A1 | 11/2002 | Hemphill | |
| 2005/0073076 A1 | 4/2005 | Woods et al. | |
| 2007/0090562 A1 | 4/2007 | Hawkins | |

FOREIGN PATENT DOCUMENTS

DE 10105976 A1 8/2002

OTHER PUBLICATIONS

ISR/Written Opinion for PCT/US2009/064358 mailed on Jan. 6, 2010.

\* cited by examiner

*Primary Examiner* — James Sanders
(74) *Attorney, Agent, or Firm* — Thi D. Dang

(57) ABSTRACT

Methods and apparatuses for making PMC's and composites include an infusing step wherein the resin reservoir and the preform are maintained under substantially the same vacuum pressure during the infusing step. Substantially the same vacuum pressure may be accomplished using a collapsible resin reservoir that is enclosed within or external to the vacuum bagging assembly of the fiber preform. This method results in a maximum achievable vacuum compaction pressure and simplified resin infusion process. This process may be used to manufacture prepregs and aerospace grade fiber reinforced resin composites, also disclosed herein, that have fiber volume, void content and laminate quality that meets or exceeds those made using an autoclave.

13 Claims, 8 Drawing Sheets

CONSTANT PRESSURE INFUSION PROCESS FOR RESIN TRANSFER MOLDING

This application claims benefit of priority from U.S. Provisional Application No. 61/116,611, filed on Nov. 20, 2008, the content of which is incorporated herein by reference in its entirety.

BACKGROUND OF THE INVENTION

1. Field

Embodiments of the present disclosure pertain to resin infusion processes and, in particular, to resin infusion processes for the fabrication of fiber reinforced composites employing vacuum pressure processing.

2. Description of the Related Art

Fiber-reinforced polymer matrix composites (PMCs) are high-performance structural materials that are commonly used in applications requiring resistance to aggressive environments, high strength, and/or low weight. Examples of such applications include aircraft components (e.g. tails, wings, fuselages, propellers), boat hulls, and bicycle frames. PMCs comprise layers of fibers that are bonded together with a matrix material, such as a polymer resin. The fibers reinforce the matrix, bearing the majority of the load supported by the composite, while the matrix bears a minority portion of the load supported by the composite and also transfers load from broken fibers to intact fibers. In this manner, PMCs may support greater loads than either the matrix or fiber may support alone. Furthermore, by tailoring the reinforcing fibers in a particular geometry or orientation, the composite can be efficiently designed to minimize weight and volume.

Numerous processes have been developed for the manufacture of PMCs. Examples may include wet layup, prepregging, and liquid infusion. In wet layup, the reinforcing fiber is wet with the matrix material, placed into a mold cavity, and allowed to harden or cure. This process may be performed in an automated fashion, such as with a chopper gun or a machine that receives dry fiber rolls, runs them through a resin dip bath, and places the wetted fibers in the mold. Alternatively, the resin may be applied manually using brushes.

In prepregging, composite components are fabricated with pre-impregnated woven fabrics or prepregs. The reinforcing fibers are impregnated with the matrix resin in a controlled fashion and frozen in order to inhibit polymerization of the resin. The frozen prepregs are then shipped and stored in the frozen condition until needed. When manufacturing composite parts from prepregs, the prepregs are, thawed to room temperature, cut to size, and placed in the mold cavity. Once in place, the prepregs are vacuum bagged and cured under pressure to achieve the required fiber volume fraction with a minimum of voids.

In liquid infusion processing, the reinforcing fibers are placed within a mold cavity or other mechanism for net-shape tooling in dry conditions, wetted with the matrix resin, and cured. Liquid infusion processing may be accomplished by a variety of techniques, including high and low pressure resin transfer molding (RTM), Resin Film Infusion (RFI), vacuum assisted resin transfer molding (VARTM), pultrusion, hyper VARTM, Seeman composite resin infusion molding process (SCRIMP®), reaction injection molding (RIM) or same qualified resin transfer molding (SQUIRTM).

Each of these processes may be problematic, however. While relatively inexpensive, wet layup fabrication typically produces composites having low fiber volume fractions and high porosity, which reduce the overall strength and quality of the composite so manufactured. In contrast, while fabrication of composites through prepregging can achieve higher fiber volume fractions and reduced void content, the cost to fabricate prepregs is much higher. Furthermore, the shelf life of the frozen prepregs is limited, due to continued polymerization, even in the frozen state, and handling must be carefully controlled. Fabrication of composites by infusion and other closed mold processes, such as RTM, is also expensive, owing to the high cost to obtain and maintain the requisite tooling and liquid injection systems.

SUMMARY

There is a need in the art for composites, and the methods and apparatus for processing these materials, that will have high fiber volume fractions and low porosity, which will increase the strength and quality of the composites that are manufactured, while reducing the cost to produce the materials.

DETAILED DESCRIPTION

One embodiment of the invention, the Constant Pressure Infusion Process (CPI VARTM) discussed herein may substantially reduce variations in the properties of polymer matrix composites that may arise due to internal pressure gradients, providing a robust, repeatable, predictable, and controlled composite manufacturing process. In one embodiment, the likelihood of a pressure gradient forming or persisting across a fiber preform during infusion or curing of the matrix may be inhibited. This results in the highest achievable preform compaction at all times which may inhibit potential changes in the evacuated volume during the matrix infusion process. This process consistently yields composite laminates that meet or exceed those made from traditional prepregs and cured in an autoclave. In addition, embodiments of the CPI VARTM process does not require any additional equipment beyond that of including the resin reservoir and associated feed line/flow constrictor into the bagging scheme.

In addition, embodiments of the present invention also allow for a significantly simplified infusion process. This is accomplished via the location of the resin feed source within the bagging of the component, which reduces or substantially eliminates the need to use external tubing or resin feed sources. This allows the most optimum packing of the components to be infused into an oven, which significantly reduces the cost of composite production, as more components may be yielded from one oven run.

The terms "approximately", "about", and "substantially" as used herein represent an amount close to the stated amount that still performs the desired function or achieves the desired result. For example, the terms "approximately", "about" and "substantially" may refer to an amount that is within less than 10% of, within less than 5% of, within less than 1% of, within less than 0.1% of, and within less than 0.01% of the stated amount.

The term "prepreg" as used herein has its ordinary meaning as known to those skilled in the art such as described above. Prepregs may include sheets or lamina of fibers that have been impregnated with a matrix material within at least a portion of their volume. The matrix may be present in a partially cured state. In one embodiment, the prepreg has a porosity between about 0.1 to 1.5 vol. %, on the basis of the total volume of the prepreg.

The terms "cure" and "curing" as used herein have their ordinary meaning as known to those skilled in the art and may include polymerizing and/or cross-linking processes. Curing may be performed by processes that include, but are not limited to, heating, exposure to ultraviolet light, and exposure to radiation. In certain embodiments, curing may take plate within the matrix. Prior to curing, the matrix may further comprise one or more compounds that are, at about room temperature, liquid, semi-solid, crystalline solids, and combinations thereof In certain embodiments, infusing and curing may be performed in a single process.

The terms "matrix", "resin", and "matrix resin" as used herein have their ordinary meaning as known to those skilled in the art and may include one or more compounds comprising a thermoset and/or thermoplastic materials. Examples may include, but are not limited to, epoxies, epoxy curing agents, phenolics, phenols, cyanates, imides (e.g., polyimides, bismaleimide (BMI), polyetherimides), polyesters, benzoxazines, polybenzimidazoles, polybenzothiazoles, polyamides, polyamidimides, polysulphones, polyether sulphones, polycarbonates, polyethylene terepthalates, and polyether ketones (e.g. polyether ketone (PEK), polyether ether ketone (PEEK), polyether ketone (PEKK) and the like), combinations thereof, and precursors thereof. In one embodiment, the resin is a single part epoxy resin system. In another embodiment, the resin is a low viscosity, single part epoxy resin. In another embodiment, the resin has a very high viscosity at room temperature but has a low viscosity and long pot life at an elevated temperature. In this case, the high viscosity of the resin may prohibit the flow of resin into the preform at room temperature. Thus, during the process, the resin may be heated to a temperature that would melt the resin to a low viscosity and allow the resin to flow into the preform. A high viscosity resin may have a viscosity of about 3000 cp to about 20000 cp at ambient temperature, and the high viscosity resin may have a viscosity of about 50 cp to about 500 cp at 30 to 125 degrees C. In another embodiment, the resin has a low viscosity at room temperature. A low viscosity resin may have a viscosity of about 50 cp to about 700 cp at ambient temperature. In one embodiment, the matrix content of the composite is about 30 to 70 vol. % on the basis of the volume of the composite.

The term "infusing" as used herein has its ordinary meaning as known to those skilled in the art and may include the introduction of a resin into a preform. In one embodiment, infusing a resin may include mechanically driving the resin into the preform by vacuum pressure. In another embodiment, infusing may take place by applying one or more of heat and external pressure to the resin reservoir. The application of heat or pressure promotes passage of the resin from the reservoir to the preform. In one embodiment, infusion occurs at between about 40 to about 120° C. In another embodiment, the infusion occurs at about ambient temperature.

The term "reservoir" as used herein has its ordinary meaning as known to those skilled in the art and may include a collapsible reservoir, such as a collapsible membrane or other flexible reservoir, or a piston driven reservoir. In another embodiment, the reservoir is part of a collapsible standard infusion bagging scheme with a resin bleed system. The methods and apparatus discussed herein may include one or more resin reservoirs. Multiple resin reservoirs may be linked with the one or more preforms, such as in series or parallel or daisy-chained together to deliver adequate resin and completely infuse the preform.

In one embodiment of the present invention, the resin feed system is comprised of a collapsible resin bag or reservoir which is maintained in the same state of vacuum as the preform that is to be infused. In addition, the resin reservoir is typically placed within the same bag as the preform being infused. The process follows conventional methods in that the preform is compacted via any number of previously described methods that are covered under the prior art. One embodiment of the present invention does not utilize an external resin feed source, controlled or uncontrolled, but instead utilizes an internal source that relies on the inability of the resin reservoir to resist the applied atmospheric pressure on the reservoir under the vacuum bag. This system allows the preform to be completely compacted and held at a full atmosphere of pressure for the entire process. In one embodiment, the resin feed reservoir is also held under the same full atmospheric conditions; however, the resin is not allowed to fill the evacuated space upon application of the vacuum.

The flow of resin can be halted via several methods. For example, in one embodiment, a resin may be used that has a high viscosity at room temperature which inhibits flow and then melts, or becomes a low viscosity, upon heating during the infusion process. In another embodiment, a flow constrictor may be used between the resin reservoir and the preform that is activated either by heat or by an external influence. The flow restriction device may be disposed on a feed line between the reservoir and the preform, such as an external valve, which prevents the resin from flowing into the preform while closed.

In another embodiment, the resin begins to infuse the preform immediately upon application of vacuum, however, in another embodiment, the resin flow starts after the preform has been completed, compressed and readied for infusion.

The term "fluid communication" as used herein has its ordinary meaning as known to those skilled in the art and may be related to a structure such as a feed line connected from the reservoir to the feed line of the preform. In one embodiment, the rate of the resin passing from the reservoir to the preform is between 10 ml/min. to 1000 ml/min.

The term "preform" or "fiber preform" as used herein has its ordinary meaning as known to those skilled in the art and may include an assembly of fibers, such as unidirectional fibers and woven fabrics, that is ready for receiving resin. The methods and apparatus discussed herein may include one or more preforms.

The term "vacuum" or "vacuum pressure" as used herein has its ordinary meaning as known to those skilled in the art and may include vacuum pressure of 1 atmosphere or less. During the infusing step, substantially the same vacuum pressure may be applied during the length of the infusing step. In one embodiment, the amount of vacuum is about 0-1 atm. In another embodiment, more pressure may be added by a secondary means such as by a pressurized cell, for example, an autoclave. Vacuum pressures of 1 atm, 0.9 atm, 0.8 atm, 0.7 atm, 0.6 atm, 0.5 atm, 0.4 atm, 0.3 atm, 0.2 atm, 0.1 atm are also contemplated. In one embodiment, substantially no pressure gradient forms in the preform during the infusing step. In one embodiment, the process relates to, but is not limited to, vacuum-only resin infusion processes for making fiber reinforced composites. In one embodiment, the vacuum pressure is fully maintained over the entire dry fiber preform over the entire infusion and cure cycle.

The term "enclosure" or "vacuum bag" as used herein each has its ordinary meaning as known to those skilled in the art and may include any enclosure or vacuum bag that is capable of maintaining substantially the same vacuum pressure of the reservoir and the preform during the infusing or curing step. In one embodiment, the enclosure or vacuum bag compresses the preform. For instance, in one embodiment, at least a portion of the enclosure substantially conforms to the shape of the preform, when subjected to vacuum pressure. In another embodiment, the enclosure or vacuum bag comprises at least one of polyethylene, polyurethane, latex, silicone, and vinyl, such as plastic bag. In another embodiment, the enclosure or vacuum bag comprises a semi-rigid material that covers all or part of the perform to established a vacuum membrane.

In one embodiment, the preform and the resin reservoir are in the same enclosure or vacuum bag. The methods and apparatuses discussed herein may include one or more enclosures or vacuum bags. In another embodiment, the preform and the resin reservoir are in separate enclosures or vacuum bags.

In one embodiment, the reservoir may be depleted and the preform may be filled, and subsequently the component part may be then cured to completion. After curing the component, it may be non-destructively inspected with ultrasonic methods and measured for at least one of thickness, fiber volume, and void content. In one embodiment, the component comprises one or more stiffening members incorporated therein. The component may be set up with floating cauls to support the stiffeners, during the curing process. The component part preferably meets aerospace requirements with minimum variation.

The term "composites" as used herein each has its ordinary meaning as known to those skilled in the art such as described above, and includes laminates and polymer matrix composites. In one embodiment, the composite has a fiber content of at least 55%, and in other embodiments 60% or greater, 65% or greater, 70% or greater, 75% or greater, 80% or greater on the basis of the total volume of the composite. In one embodiment, the composite has a porosity between about 0.1 to 1.5 vol. %, on the basis of the total volume of the composite. The process may yield composites having high fiber volumes and low void contents that meet or exceed those of conventional composites manufactured in an autoclave. The resulting composites can be used in applications including, but not limited to, aerospace applications.

The term "fiber volume fraction" as used herein each has its ordinary meaning as known to those skilled in the art, and includes the amount fiber in a composite, based on a percentage of fiber volume of the total composite volume. In some embodiments, the fiber volume fraction of the composite is greater than the fiber volume fraction of a composite containing the same components but produced by a method wherein the reservoir and the preform are not maintained under substantially the same vacuum pressure during the infusing step. The type of fiber or textile used in the composite affects the fiber volume fraction calculation and thus, in some embodiments, the identical fiber or textile is used in a comparison of the fiber volume fraction of a composite produced by a method disclosed herein and the fiber volume fraction of a composite produced by a conventional method. In other embodiments, the methods described herein achieve a fiber volume fraction of the composite that is 1% or greater, such as 2% or greater, 3% or greater, 4% or greater, 5% or greater, 6% or greater, 7% or greater, 8% or greater, 9% or greater or 10% or greater, such as about 3-5% or greater than a the fiber volume fraction achieved using a conventional VARTM process, such as one wherein the reservoir and the preform are not maintained under substantially the same vacuum pressure during the infusing step. An additional embodiments, the fiber volume fraction is 58% or greater by volume, including 59% or greater, 60% or greater, 61% or greater, 62% or greater, 63% or greater, 64% or greater or 65% or greater by volume.

The term "thickness" as used herein each has its ordinary meaning as known to those skilled in the art, and includes the thickness of each of one or more plies comprising the composite. In some embodiments, the one or more plies are of a substantially uniform thickness, for example, the thickness does not substantially vary over the entire area of each of the plies. In some embodiments, there is about 3% or less, 2.5% or less, 2% or less, 1.5% or less, 1% or less, or 0.5% or less variation over the area of each of the plies. A ply may include a thick ply which may be referred to as a blanket.

The processes described herein may include additional steps. For example, the preform may be subjected to compacting and debulking, even before or during the infusing step. In one embodiment, the compaction pressure is substantially constant throughout the duration of the infusing step. Generally, the compaction pressure during the infusing step is greater than conventional processes, that is, wherein the resin reservoir and the preform are not under substantially the same vacuum pressure.

The processes described herein may further comprise heating at least a portion of the resin before the infusing step. In one embodiment, an entire assembly including the resin reservoir and the preform may be placed into the oven and heated to a temperature that melts the resin to a low viscosity and allow the resin to flow into the preform.

The term "at least a portion of" as used herein represents an amount of a whole that comprises an amount of the whole that may include the whole. For example, the term "a portion of" may refer to an amount that is greater than 0.01% of, greater than 0.1% of, greater than 1% of, greater than 10% of, greater than 20% of, greater than 30% of, greater than 40% of, greater than 50% of, greater than 60%, greater than 70% of, greater than 80% of, greater than 90% of, greater than 95% of, greater than 99% of, and 100% of the whole.

The term "room temperature" or "ambient temperature" as used herein has its ordinary meaning as known to those skilled in the art and may include temperatures within the range of about 16° C. (60° F.) to 32° C. (90° F.). The term "fiber" as used herein has its ordinary meaning as known to those skilled in the art and may include one or more fibrous materials adapted for the reinforcement of composites. Fibers may take the form of any of particles, flakes, whiskers, short fibers, continuous fibers, sheets, plies, and combinations thereof. Continuous fibers may further adopt any of unidirectional, multi-dimensional (e.g. two- or three-dimensional), non-woven, woven, knitted, stitched, wound, and braided configurations, as well as swirl mat, felt mat, and chopped mat structures. Woven fiber structures may comprise a plurality of woven tows having less than about 1000 filaments, less than about 3000 filaments, less than about 6000 filaments, less than about 12000 filaments, less than about 24000 filaments, less than about 48000 filaments, less than about 56000 filaments, less than about 125000 filaments, and greater than about 125000 filaments. In further embodiments, the tows may be held in position by cross-tow stitches, weft-insertion knitting stitches, or a small amount of resin, such as a sizing.

The composition of the fibers may be varied, as necessary. Embodiments of the fiber composition may include, but are not limited to, glass, carbon, aramid, quartz, polyethylene, polyester, poly-p-phenylene-benzobisoxazole (PBO), boron, silicon carbide, polyamide, carbon, and graphite, and combinations thereof. In one embodiment, the fiber is carbon, fiberglass, aramid or other thermoplastic materials. The reinforcing fibers may be organic or inorganic. Further, the fibers may include textile architectures including those that are either continuous or non-continuous in form.

The term "layup" as used herein has its ordinary meaning as known to those skilled in the art and may include one or more prepregs that are placed adjacent one another. In certain embodiments, the prepregs within the layup may be positioned in a selected orientation with respect to one another. In a further embodiment, the prepregs may optionally be stitched together with a threading material in order to inhibit their relative motion from a selected orientation. In additional embodiments, "layups" may comprise any combination of fully impregnated prepregs, partially impregnated prepregs, and perforated prepregs as discussed herein. Layups may be manufactured by techniques that may include, but are not limited to, hand layup, automated tape layup (ATL), advanced fiber placement (AFP), and filament winding.

The term "consolidation" as used herein has its ordinary meaning as known to those skilled in the art and thus includes processes in which the resin or matrix material flows so as to displace void space within and adjacent fibers. For example, "consolidation" may include, but is not limited to, flow of matrix into void spaces between and within fibers and prepregs, perforations, and the like. "Consolidation" may further take place under the action of one or more of heat, vacuum, and applied pressure.

The term "liquid infusion processing" as used herein has its ordinary meaning as known to those skilled in the art and may include conventional liquid infusion processing. The liquid infusion process may include any process by which the reinforcing fibers are first placed into a mold cavity, die head, or any other means of net shaped tooling in a dry condition and then wetted with the resinous matrix and then cured. This process can be accomplished with many different processing strategies including RTM, RFI, VARTM, RTM Light, Pultrusion, Hyper VARTM, SCRIMP, RIM, SQUIRTM, and a host of other processes that are variations of the liquid infusion process. Each of these conventional processes has advantages and disadvantages. The primary difference between most of the processes relate to the precision and the cost of the tooling.

For conventional RTM and the closed mold processes, procuring and maintaining the tooling is expensive, however tooling is the most central part of that process. The mechanism determines the final shape and surface control of the component and also plays an active role in determining how the resin fills and wets out the dry fibers enclosed within it. Conventionally, there are constraints on the size and shape of the components made with these closed mold processes as tooling becomes unmanageable. In addition to the tooling, the conventional equipment needed to inject resin at temperature and a high pressure, such as, presses and injection machines can also be very expensive to buy and maintain. There are some variations within the closed mold processes that utilize lower cost tooling and eliminate the resin injection systems but in general they are more expensive than the other liquid infusion processes. These processes, however, generally yield the required high fiber volumes and minimal void required of aerospace grade laminates.

Liquid infusion processing also includes a single sided liquid infusion process which is a variation of the closed mold process. Instead of a 2 sided tool, a single sided tool is used in this process with a flexible bag used on the opposite side. This process is a low cost version of the closed mold process because it only requires a single sided mold, requires minimal additional equipment to support the process, and has very few constraints. The process utilizes vacuum (atmospheric pressure) alone to feed and fill the resin wetting the dry fibers. By using low viscosity resinous materials and proper infusion techniques which maintain vacuum pressure on the laminates, aerospace grade laminates can be manufactured.

One of the complications with this conventional process arises because the resin feed system is typically external to the bagged preform and the resin feed is usually monitored on a part by part basis. This system results in numerous inlet and outlet tubes that must be monitored and controlled during the process and present the opportunity for leaks to form and errors to occur. This additional complication constrains the number of components that can be infused at one time and as a result increased costs are incurred due to inefficient use of space in the oven. As previously discussed, prepreg laminates made in an autoclave are typically arranged to allow the maximum number of components to be cured at once.

Another conventional liquid infusion process is pultrusion, which is very restricted compared to the other liquid infusion processes. The method of pultrusion comprises introducing dry fibers into a die with a certain cross section and then once in place introducing resin and then curing. This process is typically used to fabricate long, continuous components that have a typical/constant cross section.

The conventional single sided liquid infusion method described above which relies on vacuum (e.g., atmospheric pressure) alone to feed and wet the dry fibers is discussed below in more detail. Conventional liquid infusion of dry fibers using vacuum (atmospheric pressure) as the primary force in feeding and wetting the dry fibers of a preform is well known within the industry. There are numerous patents that have been awarded around this process starting with the Marco method (U.S. Pat. No. 2,495,640) and Smith (U.S. Pat. No. 2,913,036) which were first used in the 1940's and 50's up to more recent patents from Palmer (U.S. Pat. No. 4,942, 013) and Seeman (U.S. Pat. No. 4,902,215). There are also numerous variations to the process that have been detailed in technical presentations and journals that describe methods of introducing and distributing the resin into the dry fibers.

Figure 1A:
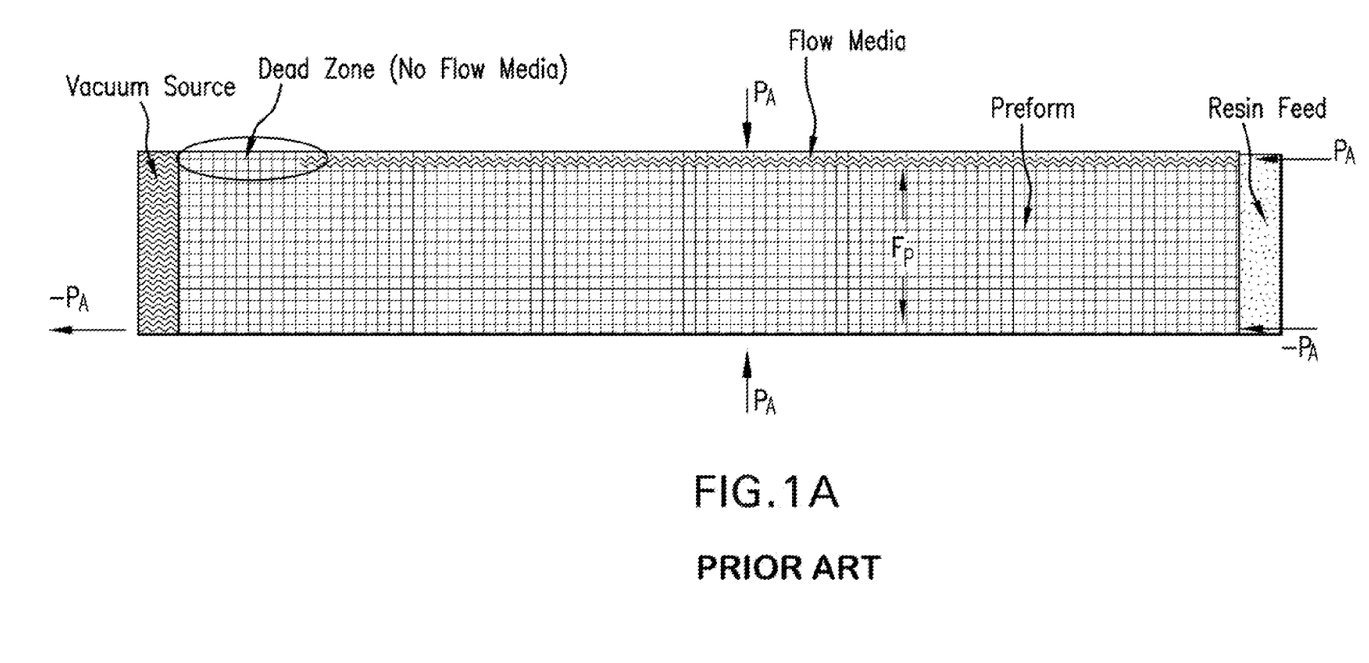
FIG. 1A is a schematic illustration of the pressure within a fiber preform during a resin infusion process prior to resin infusion.

The use of atmospheric pressure to infuse or impregnate dry fibers (preforms) is a fairly straight forward process that takes advantage of the natural pressure differential existing between the atmosphere and a vacuum. In a typical conventional infusion process the resin container or liquid resin feed system is resting at atmospheric conditions and the preform is under a bag in a vacuum condition. The preform is compressed by the atmosphere against the bagging and as a result generates an equal reaction force onto the bagging as shown in FIG. 1A.

The net result is a net volume of evacuated space that is filled in some percentage by the fibers of the preform with the remaining volume being open space. The volume of evacuated space is dependent upon several variables including the amount of vacuum within that space which determines the amount of atmospheric pressure compressing the preform and the resiliency of the preform to being compressed. This resiliency is commonly called the "Bulk Factor" of the preform. In order to achieve aerospace quality laminates the fiber percentage in that volume needs to be greater than 55% typically. The fiber percentage is a function of many variables that are present in constructing the preform like textile construction, fiber/tow size and fiber alignment.

There are several methods for compacting the preform to a state of 55% or greater fiber volume. This may include numerous debulk cycles as described in Woods (US Pat. App. Pub. No. 2005/0073076 A1). Compacting also may involve applying heat with the debulk cycle to help bind the preform together. Yet another process involves designing textiles that nest tightly together. There are numerous other methods that have been described in technical literature but the goal of all of these processes is to increase the fiber percentage within that evacuated volume. By increasing the fiber percentage, one can improve the mechanical properties of the laminate due to the increase in density of the primary load carrying members (the fibers).

The natural detractor of compaction of the preform is a reduction in vacuum and the resulting loss of atmospheric pressure compressing the preform. As the vacuum is reduced the resiliency of the preform acts against the bagging which effectively increases the volume and decreases the density of the fibers. This natural detractor is a major concern in a typical infusion process because this is the primary force that feeds and fills the preform with resin.

Figure 1B:
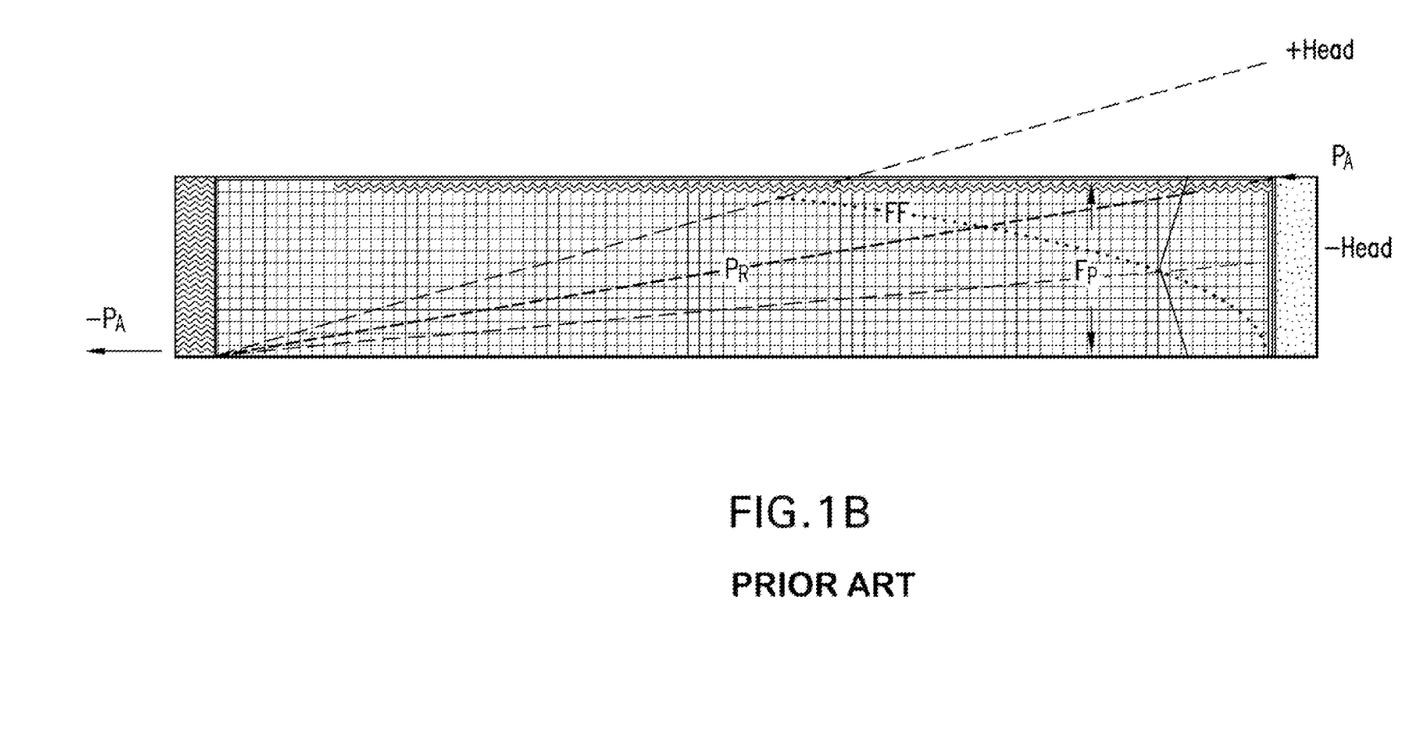
FIG. 1B is a schematic illustration of the pressure within the fiber preform during a resin infusion process after a pressure gradient has formed.

In a typical infusion process, the infusion begins when the steady state shown in FIG. 1A becomes an open system when the resin feed is opened and atmospheric pressure creates a pressure gradient forcing the resin into the compressed preform as shown in FIG. 1B.

Specifically, FIGS. 1A-1B illustrate the problems with conventional infusion processes. FIG. 1A is a schematic of a conventional infusion process in the steady state condition of being vacuum bagged and ready for infusion. In one instance, the vacuum may be on and the resin feed may be closed, with no pressure gradient across the preform. Atmospheric pressure ($P_A$) exists everywhere with a net resultant bag pressure of 1 atmosphere. The preform is reacting against the tool and bag with mechanical resistance force $F_P$.

FIG. 1B is a schematic of the infusion process in the initial open state when the resin feed line is opened and the pressure gradient forms. The pressure gradient forms across the preform from the vacuum outlet $P_A$ to the resin inlet at a pressure of resin pressure, $P_R=P_A+$(Head). This causes resin to flow from the high pressure zone to the low pressure zone. Head is any +/− pressure due to the height of the column of resin in the feed tube prior to entering the preform. If the bucket is above the feed point, there is positive head causing a resin pressure that is greater than 1 atmosphere at the feed point. If the bucket is below the feed point, there is negative head and the resin will be at a pressure lower than atmospheric. It is noted that viscous effects generally induce some (−) Head per permeability losses and Darcys Law. If the viscous losses or (−) Head meets or exceeds the vacuum induced pressure gradient then the infusion will stall. It is also noted that if the reactive force of the preform ($F_P$) continues and vacuum pressure decreases (returns to $P_A$) during infiltration $F_P$ will effectively decrease to an uncompressed physical state.

The resulting pressure gradient across the preform not only drives the resin into the evacuated volume but also reduces the vacuum pressure that is compressing the preform. This loss of vacuum allows the resiliency of the preform to act against the bag increasing the volume where the vacuum has been reduced. As the infusion continues, the reduced vacuum area grows as more resin is drawn into the evacuated volume as shown in FIGS. 1C and 1D.

Figure 1C:
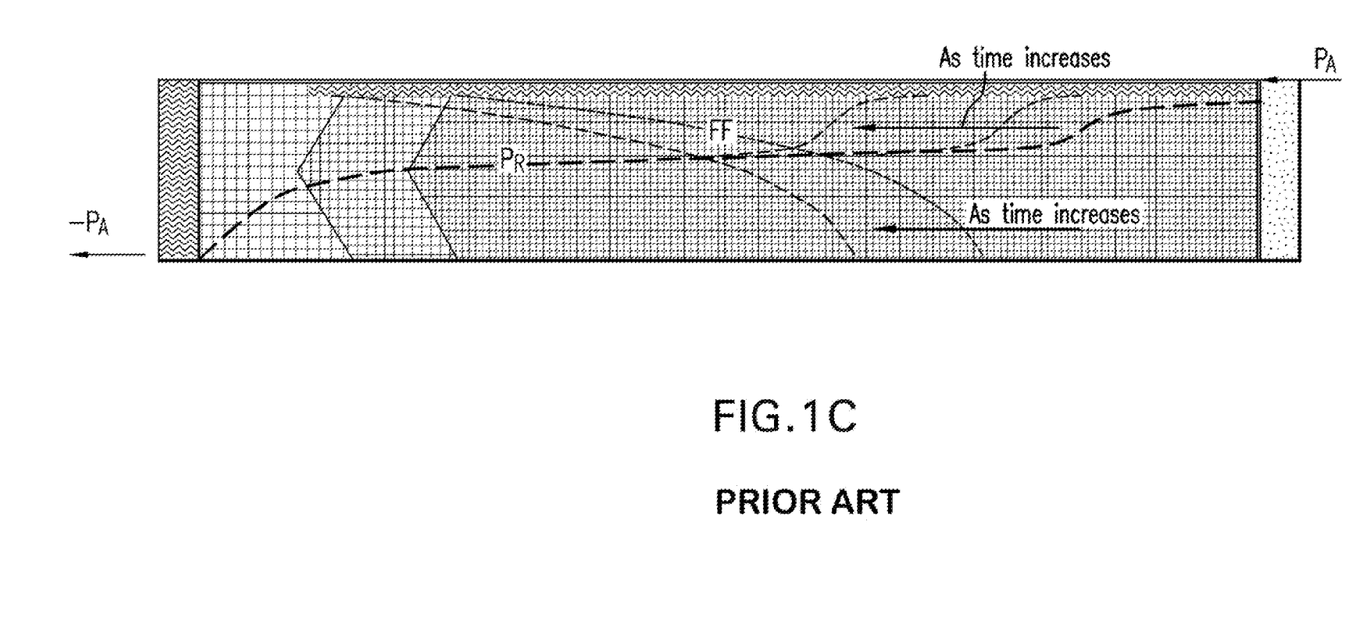
FIG. 1C is a schematic illustration of the pressure within the fiber preform during a resin infusion process as resin is drawn into evacuated areas of the fiber preform.
Figure 1D:
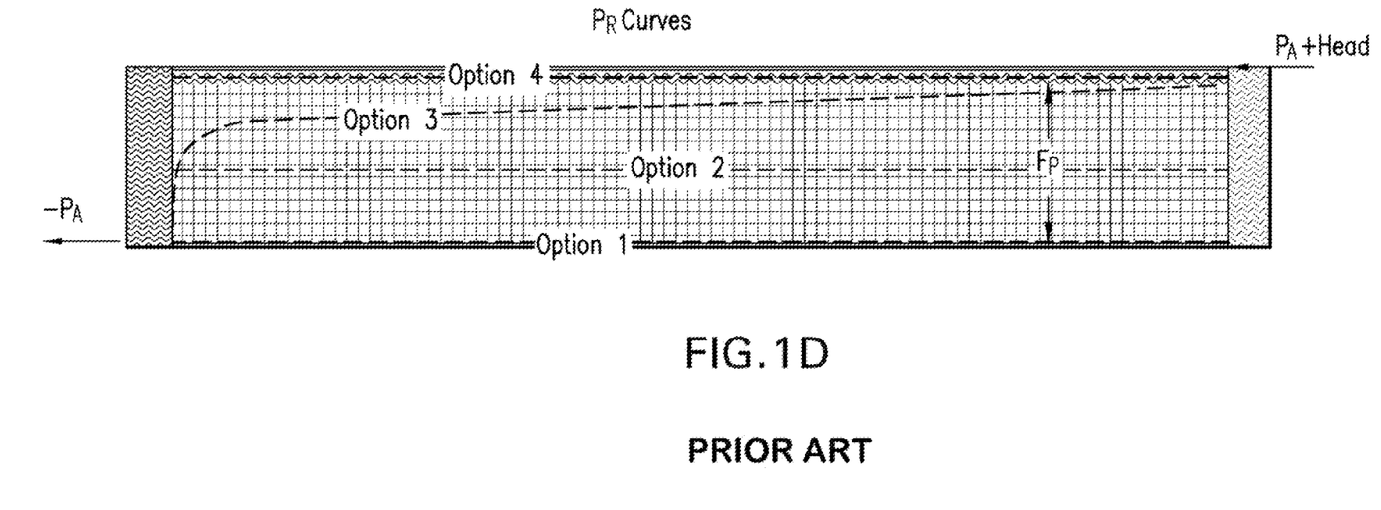
FIG. 1D is a schematic illustration of the pressure within the fiber preform after resin has filled at least a portion of the evacuated areas of the fiber preform.

As shown in FIGS. 1C and 1D the pressure gradient within the preform and the resulting changes in the preform thickness and fiber volume vary during the infusion process and are difficult to control. The variation is dependent upon numerous inputs including part size, thickness, permeability, flow media materials, bagging schemes, resin inlet and outlet positions and numerous other factors that affect how the resin is introduced and fed into the preform. This uncontrolled variation has been a major obstacle to adopting infusion processes into aerospace components, as it results in non-uniform thicknesses or low fiber volumes.

More specifically, FIG. 1C is a schematic illustration of the infusion process in an open state as resin is drawn into the evacuated volume, filling the open space and reducing the vacuum pressure in that area. The pressure gradient across the preform induces resin flow through the preform accumulating viscous losses. Resin pressure $P_R$ follows the pressure gradient with viscous losses. As time increases during the infusion, the preform reactive force $F_P$ progressively decreases starting from the vacuum point to the feed point. It is noted that viscous losses are a function of length from the resin flow front to the resin feed point. As the length increases, the losses accumulate, causing reduced flow through the preform. If the length is too long, the resin losses overcome the pressure gradient, causing the flow front to stall. This progressive filling of the preform typically continues until one of the following occurs: 1) the appropriate amount of resin is fed and the resin feed line is closed; 2) the preform is fully infused and the resin exits the vacuum port; 3) the resin flow front reaches the dead zone and the resin feed line is shut off.

FIG. 1D is a schematic illustration of the infusion process after the resin has filled the evacuated volume and filled the preform. The schematic shows the pressure gradient for the various options ending the infusion process.

Option 1: (closed resin feed, with or without dead zone, with bleed) over time the non-rigid bag collapses (loss of volume) as excess resin is removed by the vacuum source. Once the bag engages the preform again, the preform exerts a reaction force $F_R$ onto the bag until $P_A$ is established over the preform. Once the volume is constrained and the system is now a rigid container, the resin pressure $P_R$ returns to vacuum pressure −$P_A$.

Option 2: (closed resin feed, with or without dead zone, closed vacuum) over time the resin pressure $P_R$ reaches an equilibrium across the preform greater than vacuum pressure.

Option 3: (open resin feed, with or without dead zone, with bleed) over time the resin pressure PR reaches an equilibrium gradient ([$P_A$+Head] to −$P_A$) in the flow media due to path of least resistance via higher permeability and resin must be continuously fed and bled during cure.

Option 4: (open resin feed, with or without dead zone, closed vacuum) over time the resin reaches an equilibrium ($P_A$+Head) across the preform.

Option 1 and 2 can be performed using a net resin process where a precise amount of resin is infused and then the resin feed is closed. Option 1 can cause excess resin bleed (drainage) or generate volatiles once a vacuum state is achieved after infusion is complete.

The conventional above-described infusion processes, which provide limited or no control on the internal pressure gradients formed during the process, have had limited success. These processes can result in laminate properties that are suitable for aerospace components, however, the processes are not robust, repeatable or predictable. This uncertainty continues to prevent the process from gaining widespread use within the aerospace industry.

In an effort to improve the flow of resin and to increase the predictability/repeat-ability of the process there have been numerous advancements in control of the flow of resin and the path which the resin takes. This process is described in Seeman (U.S. Pat. No. 4,902,215), which relates to methods for inducing flow and pressure gradients via a network of flow media within the bagging scheme and the bagging itself. Woods (US Pat. App. Pub. o. 2005/0073076 A1) describes this problem in detail and proposes the use of partial vacuum on the resin feed pot in order to control the atmospheric pressure being applied to the preform. This process is known as the CAPRI (Controlled Atmospheric Pressure Resin Infusion) process, and is intended to decrease the variability within the infused laminate. In addition to these conventional approaches, there are also numerous common knowledge approaches that have been used to regulate the feed pressure. These include using flow regulators on the feed lines or changing the elevation of the resin feed pots relative to the preform to create positive or negative head pressure.

Regardless of the bagging scheme, inlet and outlet port set up, or the pressure on the feed pot by controlling/regulating it, the primary driving force in all of the previously known art is some type of pressure gradient. This gradient within the process will always put in question whether or not full atmospheric pressure was maintained at all times across the entire preform during the infusion and cure process.

The improved processes described herein relate to liquid infusion processes described above. One embodiment of the invention may be suitable for all of the variations within the process and is not limited to one preferred method.

EXAMPLES

Numerous trials have been performed using embodiments of the CPI VARTM process described herein to fabricate aerospace quality laminates. These examples are discussed for illustrative purposes and should not be construed to limit the scope of the disclosed embodiments.

Example 1

Figure 2A:
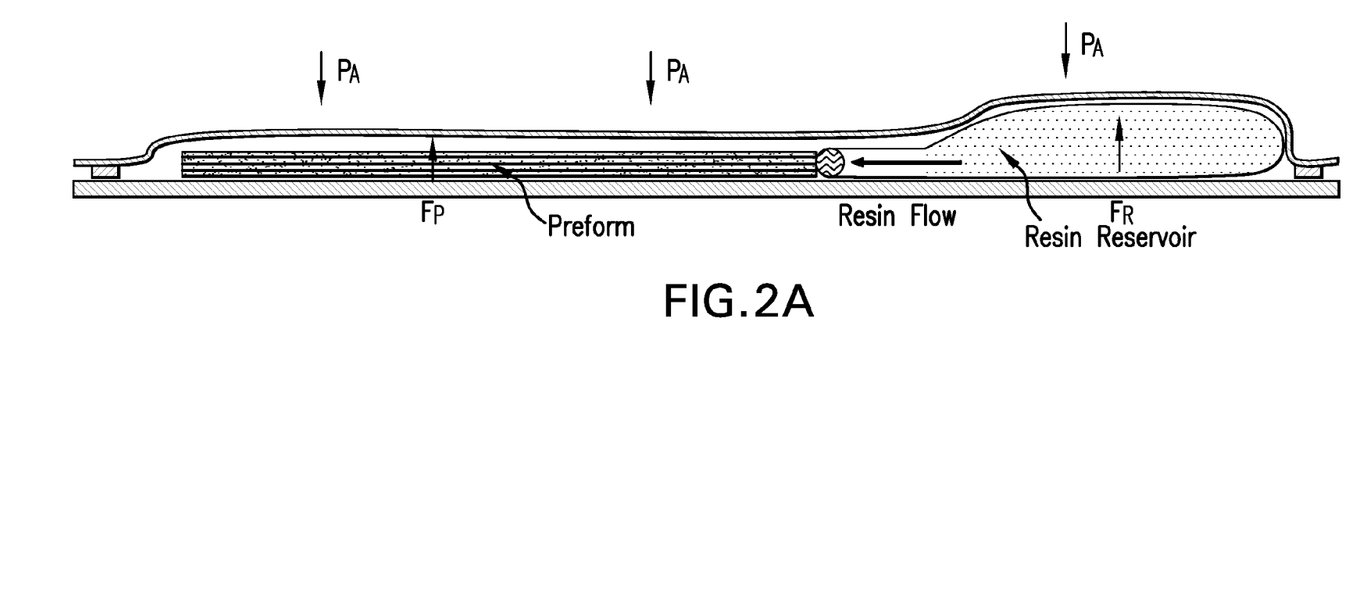
FIG. 2A is a schematic illustration of one embodiment of a resin infusion system of the present disclosure.

A single part epoxy resin system (Cytec Engineered Materials CYCOM 977-20) was used, which exhibits a very high viscosity at room temperature but has a low viscosity and long pot life at an elevated temperature. This resin was initially packaged into polypropelene plastic bags in quantities ranging from 250 grams to 1000 grams. These bags were heat sealed in such a manner that at one end there was a constriction allowing for insertion of a tube once cut. Polypropylene is an acceptable material for use in the desired cure cycle for CYCOM 977-20. This pre-packaged collapsible resin reservoir was then placed next to the preform on the tool and a feed line was connected from the reservoir to the feed line of the preform. The preform was bagged per a typical infusion scheme which incorporates a resin bleed system and a vacuum bag was placed over the preform and the resin reservoir as shown in FIG. 2A. The preform was debulked and compacted and then checked for leaks and readied for cure. The high viscosity of the resin prohibited the flow of resin into the preform during this process.

Once readied, the entire assembly was placed into the oven and heated to a temperature that would melt the resin to a low viscosity and allow the resin to flow into the preform. Once the reservoir was depleted and the preform was filled, the part was then cured to completion. After cure, the component was non destructively inspected with ultrasonic methods and measured for thicknesses, fiber volume and void content. The results of the inspection and measurements showed that the entire laminate met aerospace requirements with minimum variation of the measured properties. The laminate exhibited fiber volume fraction in excess of 58% with less than 1% variation and cured ply thickness measurement of 0.018 inches with less than 2% variation across the panel.

Example 2

Figure 2B:
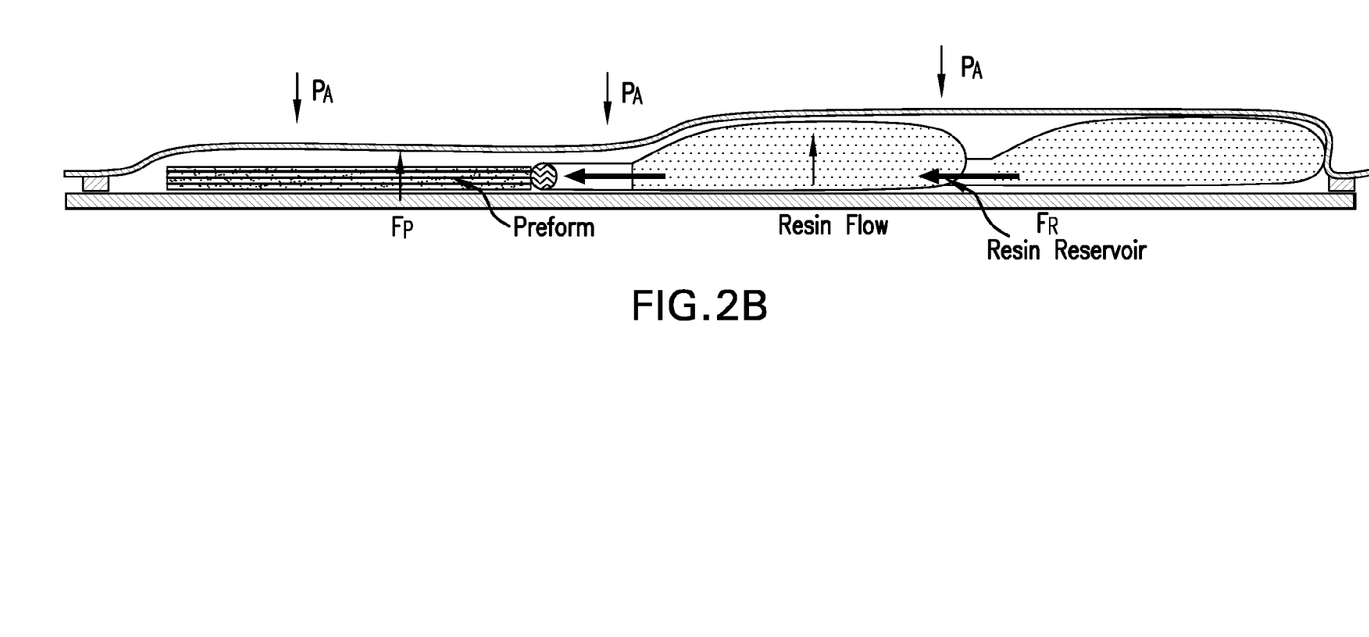
FIG. 2B is a schematic illustration of another embodiment of the resin infusion system of the present disclosure having multiple resin reservoirs.

The same single part epoxy resin and resin bags were used as in Example 1 to infuse a much larger component. The component was set up and bagged according to FIG. 2B which incorporated a standard infusion bagging scheme with a resin bleed system. To infuse this component, multiple resin reservoirs were used that were linked or daisy-chained together in order to deliver adequate resin and completely infuse the preform. The process yielded aerospace quality laminates with minimum variation.

Example 3

Figure 2C:
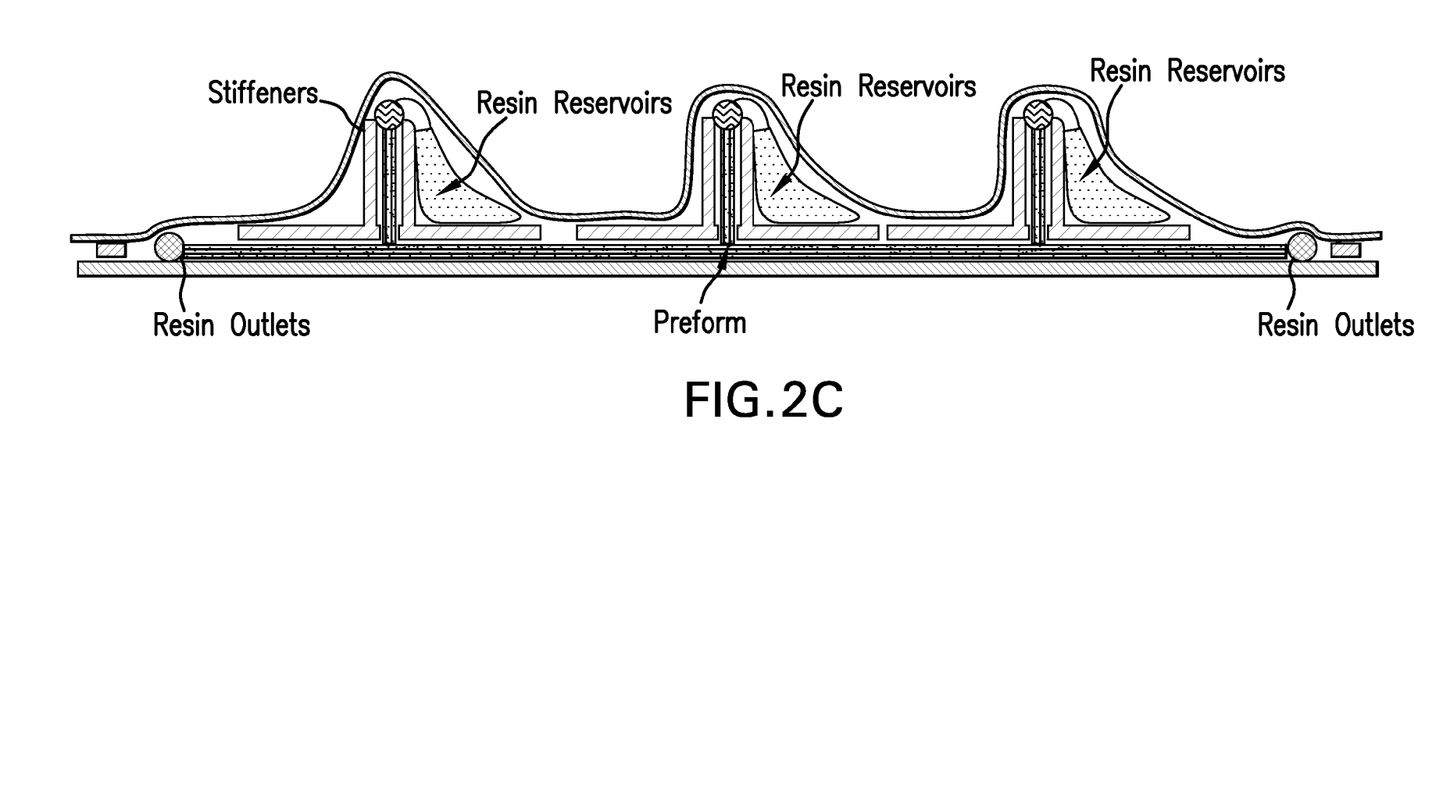
FIG. 2C is a schematic illustration of another embodiment of the resin infusion system of the present disclosure comprising support stiffeners.

The same single part epoxy resin used in Examples 1-2 was used to make a more complicated component that incorporated some stiffening members. The component was set up with floating cauls to support the stiffeners and was bagged according to FIG. 2C. As shown, the resin reservoirs were located next to the floating cauls in order to feed resin in the desired location. The process again yielded an aerospace quality laminate with minimum variation.

Example 4

Figure 2D:
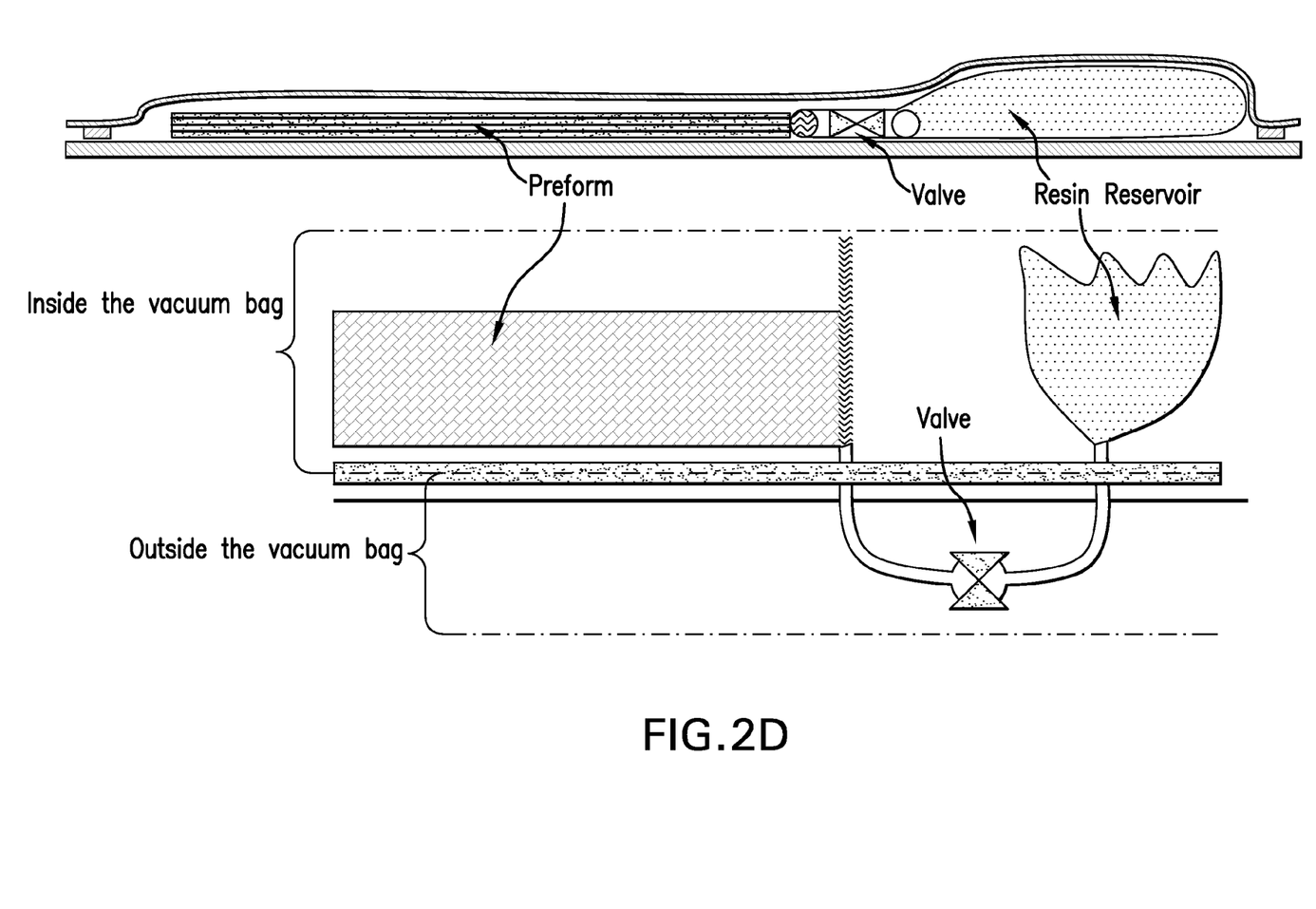
FIG. 2D is a schematic illustration of another embodiment of the resin infusion system of the present disclosure comprising an external valve.

A low viscosity single part epoxy resin and resin bag was used in which the resin was at a low viscosity at room temperature. The component was set up according to FIG. 2D, which details the incorporation of an external valve that prevented the resin from flowing into the preform while closed. The entire preform and resin reservoir were bagged and made ready for infusion. Once ready, the valve was opened and the preform was infused. This variation yielded an aerospace quality laminate with minimum variation.

It is known that those skilled in the art will recognize that variations can be made to the invention and the examples described in the preferred embodiment. The described methods, apparatuses and examples provided in this document do not limit the invention to those methods and the basic concept applies to all potential modifications. The invention is not limited to any group of processes and is applicable to all liquid infusion methods.

What is claimed is:
1. A method of manufacturing a composite, comprising:
   enclosing a fiber preform in a vacuum bag, said fiber preform having a longitudinal length with opposite ends;
   placing at least one collapsible, resin-filled bag in said vacuum bag, said resin-filled bag comprising a resin enclosed in a flexible bag;
   providing a feed line connecting the resin-filled bag to the fiber preform so that the resin-filled bag is in fluid communication with the fiber preform, said feed line having a resin inlet positioned adjacent to one opposite end of the fiber preform's longitudinal length;

applying vacuum to the vacuum bag;

infusing the fiber preform with the resin by maintaining the resin-filled bag and the fiber preform under substantially the same vacuum pressure and enabling the resin to the flow into the fiber preform, whereby the infusing resin produces substantially no pressure gradient in the fiber preform; and curing the resin-infused fiber preform.

2. The method of claim 1, further comprising debulking the fiber preform before the resin infusing step.

3. The method of claim 1, wherein a plurality of resin-filled bags are placed in said vacuum bag such that the resin-filled bags are linked to each other and one of the resin-filled bags is in direct fluid communication with the fiber preform via the feed line.

4. The method of claim 1, wherein the resin infusing step comprises mechanically driving the resin into the preform by vacuum pressure.

5. The method of claim 1, wherein the vacuum pressure is maintained at less than 1 atmosphere.

6. The method of claim 1, wherein a plurality of resin-filled bags are placed in said vacuum bag such that the resin-tilled bags are in fluid communication with the preform via separate feed lines.

7. The method of claim 1, wherein the resin in the resin-filled bag has a viscosity of about 3000 cp to about 20,000 cp at room temperature and the resin is further heated prior to resin infusion in order to lower the viscosity and to enable the resin to flow into the fiber preform during resin infusion.

8. A method of manufacturing a composite, comprising:

enclosing a fiber preform in a vacuum bag, said fiber preform having a longitudinal length with opposite ends;

placing at least one collapsible, resin-filled bag in said vacuum bag, said resin-filled bag comprising a liquid resin enclosed in a flexible bag;

providing a feed line connecting the resin-filled bag to the fiber preform so that the resin-filled bag is in fluid communication with the fiber preform, said resin feed line having a resin inlet positioned adjacent to one opposite end of the fiber preform's longitudinal length;

providing a flow restricting valve in the feed line, said valve being set in a closed position initially to prevent the liquid resin from the resin-filled bag from flowing into the fiber preform;

applying vacuum to the vacuum bag;

infusing the fiber preform with the resin by opening the flow restricting valve to allow the resin to flow from the resin-filled bag into the fiber preform, while maintaining the resin-filled bag and the fiber preform under substantially the same vacuum pressure during resin infusion, whereby the infusing resin produces substantially no pressure gradient in the fiber preform; and curing the resin-infused fiber preform.

9. The method of claim 8, wherein the liquid resin in the resin-filled bag has a viscosity of about 50 cp to about 700 cp at room temperature.

10. The method of claim 8, wherein a plurality of collapsible, resin-filled bags are placed in said vacuum bag such that the resin-filled bags are linked to each other and one of the resin-filled bags is in direct fluid communication with the fiber preform via the feed line.

11. The method of claim 8, wherein a plurality of collapsible, resin-filled bags are placed in said vacuum bag such that the resin-filled bags are in fluid communication with the preform via separate feed lines with separate flow constricting valves.

12. A method of manufacturing a composite, comprising:

enclosing a fiber preform in a first vacuum bag, said fiber preform having a longitudinal length with opposite ends;

enclosing a collapsible resin-filled bag in a second vacuum bag, wherein the collapsible resin-filled bag contains a resin having a viscosity that prohibits the resin from flowing into the fiber preform at room temperature;

providing a feed line connecting the resin-filled bag to the fiber preform so that the resin-filled bag is in fluid communication with the fiber preform, said resin feed line having a resin inlet positioned adjacent to one opposite end of the fiber preform's longitudinal length;

applying vacuum to the first and second vacuum bags;

heating the resin reservoir to lower the viscosity of the resin and to enable the resin to flow into the fiber preform, thereby infusing the fiber preform with the resin;

maintaining the fiber preform and the resin reservoir under substantially the same vacuum pressure during resin infusion, whereby the infusing resin produces substantially no pressure gradient in the fiber preform; and curing the resin-infused fiber preform.

13. A Method of manufacturing a composite, comprising:

enclosing a fiber preform in a first vacuum bag, said fiber preform having a longitudinal length with opposite ends;

enclosing a collapsible resin-filled bag in a second vacuum bag, said resin-filled bag comprising a liquid resin enclosed in a flexible bag;

providing a feed line connecting the resin-filled bag to the fiber preform so that the resin-filled bag is in fluid communication with the fiber preform, said resin feed line having a resin inlet positioned adjacent to one opposite end of the fiber preform's longitudinal length;

providing a flow restricting valve in the feed line, said valve being set in a closed position initially to prevent the liquid resin from the resin-filled bag from flowing into the fiber preform;

applying vacuum to the first and second vacuum bags;

infusing the fiber preform with the resin by opening the flow restricting valve to allow the resin to flow into the fiber preform via the feed line while maintaining the fiber preform and the resin reservoir under substantially the same vacuum pressure during resin infusion, whereby the infusing resin produces substantially no pressure gradient in the fiber preform; and curing the resin-infused fiber preform.

* * * * *